US012047415B1

(12) United States Patent
Fauset et al.

(10) Patent No.: US 12,047,415 B1
(45) Date of Patent: Jul. 23, 2024

(54) SYSTEMS AND METHODS TO PROVIDE INFORMATION SECURITY BY CONDUCTING A PHISHING VULNERABILITY ASSESSMENT

(71) Applicant: Arctic Wolf Networks, Inc., Eden Prairie, MN (US)

(72) Inventors: Nick Fauset, Peterborough (CA); Brent Bennett, Temple Terrace, FL (US); Stephen McDermott, Mendota Heights, MN (US); Marissa Lynn Pandes, Valrico, FL (US); Tim Hadden, Excelsior, MN (US); Brennon David Thomas, Helotes, TX (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 0 days.

(21) Appl. No.: 18/334,244

(22) Filed: Jun. 13, 2023

(51) Int. Cl.
*H04L 9/00* (2022.01)
*H04L 9/40* (2022.01)

(52) U.S. Cl.
CPC ...... *H04L 63/1483* (2013.01); *H04L 63/1433* (2013.01)

(58) Field of Classification Search
CPC .................. H04L 63/1483; H04L 63/1433
USPC .................................................... 726/25
See application file for complete search history.

(56) References Cited

U.S. PATENT DOCUMENTS

| 9,781,160 | B1* | 10/2017 | Irimie | H04L 63/1483 |
|---|---|---|---|---|
| 2019/0132337 | A1* | 5/2019 | Park | G06F 21/6263 |
| 2020/0053121 | A1* | 2/2020 | Wilcox | G06F 40/289 |
| 2021/0075828 | A1* | 3/2021 | Kras | H04L 63/1483 |
| 2021/0152596 | A1* | 5/2021 | Hemingway | H04L 63/1433 |
| 2022/0171860 | A1* | 6/2022 | Kras | G06F 21/577 |
| 2022/0377101 | A1* | 11/2022 | Kras | H04L 63/1483 |
| 2023/0004468 | A1* | 1/2023 | Hicks | G06F 11/0793 |

OTHER PUBLICATIONS

"Detecting Mouse Movement Without JQuery", accessed at https://stackoverflow.com/questions/13206042/detecting-mouse-movement-without-jquery on Apr. 3, 2024, posted 2012, 3 pages.

* cited by examiner

*Primary Examiner* — Christopher J Brown
(74) *Attorney, Agent, or Firm* — Barnes & Thornburg LLP

(57) ABSTRACT

In an embodiment, a non-transitory medium stores code representing instructions to be executed by one or more processors. The instructions comprise code to cause the one or more processors to receive, at a compute device associated with a user, a message that is a simulated phishing test. The instructions further comprise code to cause the one or more processors cause, without human intervention and automatically in response to receiving the message, a link included in the simulated phishing test to be selected while not indicating that the user has failed the simulated phishing test. The instructions further comprise code to cause the one or more processors determine, after the link has been clicked, that an action indicating that the user has failed the simulated phishing test has been performed.

20 Claims, 4 Drawing Sheets

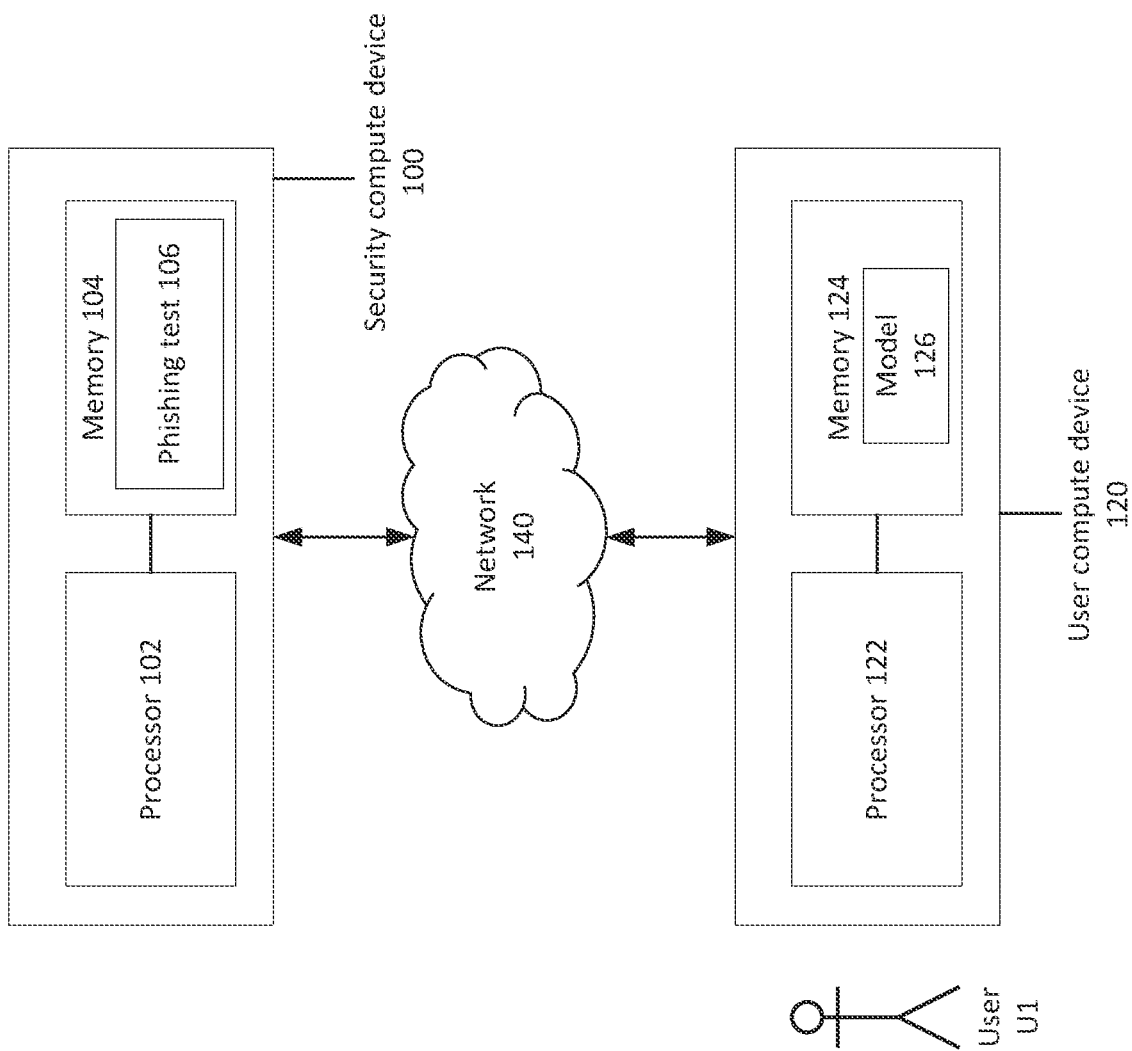

200

Receive, at a compute device associated with a user, a message that is a simulated phishing test
202

Cause, without human intervention and automatically in response to receiving the message, a link included in the simulated phishing test to be selected while not indicating that the user has failed the simulated phishing test
204

Determine, after the link has been clicked, that an action indicating that the user has failed the simulated phishing test has been performed
206

Determine that an email that is a simulated phishing test and associated with a compute device of a user has been clicked a minimum number of times and that the user has not failed the simulated phishing test
302

Determine that an action indicating that the user has failed the simulated phishing test has been performed
304

400

Determine that an email that includes a simulated phishing test and was sent to a remote compute device associated with a user has been clicked a minimum number of times, the email being clicked the minimum number of times not indicating that the user has failed the simulated phishing test
402

Determine that the user has not failed the simulated phishing test
404

SYSTEMS AND METHODS TO PROVIDE INFORMATION SECURITY BY CONDUCTING A PHISHING VULNERABILITY ASSESSMENT

FIELD

One or more embodiments are related to systems and methods to provide information security by conducting phishing vulnerability assessments.

BACKGROUND

In some known phishing simulation systems, a phishing email is disguised as a legitimate email and sent to a user's compute device. The user may not recognize the email as a phishing attempt and click a link in the email, which then identifies that the user has failed the phishing simulation and may assign and/or provide the user to remediation training. A drawback of such known systems, however, is that advances in technologies like email and virus scanning technology have introduced the potential for false positives—due to email and virus scanning technology being present in various environments (e.g., customer environments) and automatically (e.g., without human interaction) clicking (e.g., selecting, pressing, attempting to access the clicked item, reading, analyzing, inspecting, parsing, detecting, scanning, etc.) the links in phishing simulation emails. Thus, some known phishing simulation systems may falsely determine that a user has failed a phishing simulation, when in fact, the user has not.

SUMMARY

In an embodiment, a non-transitory medium stores code representing instructions to be executed by one or more processors. The instructions comprise code to cause the one or more processors to receive, at a compute device associated with a user, a message that is a simulated phishing test. The instructions further comprise code to cause the one or more processors to cause, without human intervention and automatically in response to receiving the message, a link included in the simulated phishing test to be selected while not indicating that the user has failed the simulated phishing test. The instructions further comprise code to cause the one or more processors to determine, after the link has been clicked, that an action indicating that the user has failed the simulated phishing test has been performed.

In an embodiment, a method includes determining, via a processor, that an email that is a simulated phishing test and associated with a compute device of a user has been clicked a minimum number of times and that the user has not failed the simulated phishing test. The method further includes determining, via the processor and after the determining, that an action indicating that the user has failed the simulated phishing test has been performed.

In an embodiment, an apparatus includes a memory and a processor operatively coupled to the memory. The processor is configured to determine that an email that includes a simulated phishing test and was sent to a remote compute device associated with a user has been clicked a minimum number of times. The email being clicked the minimum number of times does not indicate that the user has failed the simulated phishing test. The processor is further configured to determine, after determining that the email has been clicked the minimum number of times, that the user has not failed the simulated phishing test.

BRIEF DESCRIPTION OF THE DRAWINGS

FIG. 1 shows a block diagram of a system to conduct a phishing test, according to an embodiment.

FIG. 2 shows a workflow diagram of a method for a user compute device to determine that a user has failed a phishing test, according to an embodiment.

DETAILED DESCRIPTION

Figure 3:
FIG. 3 shows a workflow diagram of a method to determine that a user has failed a phishing test, according to an embodiment.

Some implementations are related to determining whether a user has failed a phishing test. Some implementations assume that certain actions will occur at a phishing test, and that the occurrence of those actions alone is not sufficient to determine that a phishing test has failed; rather, if and after those actions have occurred, subsequent actions of the user/their compute device will be monitored to determine if the phishing test has been failed. For example, some implementations do not assume that the initial click(s) of a link(s) in a phishing test (e.g., phishing simulation email) was done by a user. Instead, clicking the link(s) in a phishing test brings the user/user's compute device into a monitoring environment, where the user's next action(s) at their compute device is then monitored to determine if they are indeed a user who has failed the phishing test.

Some implementations reduce (e.g., partially eliminate, or completely eliminate) the occurrence of false positives for phishing tests compared to known methods. In one example, a false positive is an instance where the monitoring environment determines a user has failed the phishing test when the user actually did not yet fail the phishing test. Reducing the number of false positives can provide technological improvements. For example, by reducing the number of false positives, fewer remedial actions will be recommended and/or have to occur, thereby saving computing resources (e.g., computers don't have to run a remediation training program, computers don't have to run antivirus software, etc.), bandwidth (e.g., computers do not have to send alerts to other compute devices regarding a failed phishing test), and/or the like.

FIG. 1 shows a block diagram of a system to conduct a phishing test, according to an embodiment. FIG. 1 includes security compute device 100 and user compute device 120, each communicably coupled to one another via network 140. Security compute device 100 and user compute device 120 can be any type of compute device, such as a desktop, laptop, tablet, mobile device, and/or the like. In some implementations, user compute device 120 is not a mobile device.

Security compute device 100 includes processor 102 operatively coupled to memory 104 (e.g., via a system bus). User compute device 120 includes processor 122 operatively coupled to memory 124 (e.g., via a system bus). User compute device 120 is associated with (e.g., owned by, accessible by, used by, in the name of, purchased by, lent to, etc.) user U1. In some implementations, security compute device 100 is associated with (e.g., owned by, accessible by, an authorized service provider of, and/or the like) an entity (e.g., an employer, a school, etc.) and user U1 is a member (e.g., employee, general contractor, student, etc.) of the entity.

Memory 104 can include (e.g., store) phishing test 106. Phishing test 106 can be any type of phishing test, such as an email, text message, visual code, and/or the like. In some implementations, phishing test 106 includes one or more links that simulate malicious links (e.g., that an employer would not want their employee to click). The one or more links could be, for example, text-based and/or image-based. Phishing test 106 can be generated at security compute device 100 and/or at a compute device not shown in FIG. 1 (and sent thereafter to security compute device 100). Phishing test 106 may not actually be malicious, but instead be used to test user U1's ability to spot and avoid phishing attack. Accordingly, phishing test 106 can resemble a real phishing attack; for example, phishing test 106 may include user U1's personal information (e.g., name, email, birthday, employer, and/or the like).

In some implementations, security compute device 100 sends phishing test 106 to user compute device 120 (e.g., in real time and at machine and network speed). In response to receiving phishing test 106, user compute device 120 may automatically (e.g., without input from user U1) perform certain actions on phishing test 106, such as clicking the simulated malicious links in phishing test 106 to perform virus scanning, determine if phishing test 106 is spam, unsubscribe from an email listing, and/or the like. User compute device 120 performing these actions will not indicate that user U1 has failed phishing test 106. Instead, user U1's actions after these actions have been performed will be monitored to determine if user U1 has failed phishing test 106.

Memory 124 can include (e.g., store) model 126. Model 126 can be used to monitor user U1's actions at user compute device 120. After user compute device 120 has performed certain actions on phishing test 106 without those actions indicating the user U1 has failed phishing test 106 (e.g., virus scanning, determining if spam, unsubscribing, etc.), model 126 can monitor (e.g., automatically and without human intervention) for certain predetermined actions; in some implementations, if one or more of these predetermined actions occur, user U1 has failed phishing test 106 (or vice versa, where user U1 has failed phishing test 106 if user U1 does not perform a certain predetermined action). In some implementations, model 126 only monitors for these predetermined actions after user compute device 120 has performed the virus scanning, determined if phishing test 106 is spam, unsubscribed from being in an email distribution list, etc. Model 126 can be any type of model, such as a neural network, binary tree, rule-based model, mathematical model, and/or the like.

A predetermined action for which model 126 can monitor to determine that user U1 has failed phishing test 106 is, for example, a cursor of user compute device 120 being moved (e.g., via a mouse of user compute device 120, via a trackpad of user compute device 120, etc.). Another predetermined action for which model 126 can monitor to determine that user U1 has failed phishing test 106 is, for example, a window running on user compute device 120 being closed, minimized, placed behind a different window running on user compute device 120, and/or the like. Another predetermined action for which model 126 can monitor to determine that user U1 has failed phishing test 106 is, for example, a predetermined area on a window running on the compute device being clicked, such as a link or predetermined icon.

In some implementations, instead of or in addition to (e.g., before) model 126 monitoring for a predetermined action, model 126 can determine if user compute device 120 is a mobile compute device; if so, in some implementations, model 126 can infer that phishing test 106 has not failed (e.g., regardless of whether a predetermined action occurred after that would otherwise indicate that phishing test 106 has failed). In some implementations, instead of or in addition to (e.g., before) model 126 monitoring for a predetermined action, model 126 can determine if user compute device 120 is running a mobile browser (e.g., a browser designed for use on a mobile device); if so, model 126 can infer that phishing test 106 has not failed (e.g., regardless of whether a predetermined action occurred after that would otherwise indicate that phishing test 106 has failed).

If model 126 determines that phishing test 106 has failed, a remedial action can occur (e.g., automatically and without human intervention). If model 126 determines that phishing test 106 has not failed, phishing test 106 has passed and the remedial action does not occur.

Any type of remedial action can occur or be recommended. For example, user U1 can be assigned to perform remediation training, such as user U1 being assigned to perform remediation training and be stripped of certain privileges at user compute device 120 until the remediation training has been performed. As another example, security compute device 100 can send a message to user compute device 120 and/or a compute device not shown in FIG. 1 (e.g., a compute device of a cybersecurity analyst) indicating that phishing test 106 failed. As another example, the type of action user U1 performed to fail phishing test 106 can be logged. As another example, user U1 and/or user compute device 120 cannot (e.g., permanently, until user U1 has completed remediation training, etc.) access certain data (e.g., financial data, human resources records, intellectual property, etc.). As another example, user U1 and/or user compute device 120 cannot (e.g., permanently, until user U1 has completed remediation training, etc.) access certain software (e.g., financial software, human resources software, etc.). As another example, user U1 and/or user compute device 120 cannot (e.g., permanently, until user U1 has completed remediation training, etc.) communicate with other compute devices, such as compute devices in the finance department, compute devices outside of a predetermined region (e.g., a city, a state, a country, etc.), compute devices that user compute device 120 has not previously communicated with before, compute devices not with a predetermined subset of compute devices (e.g., compute devices owned by user U1's employer, compute devices of people who perform the same job function as user U1, etc.), and/or the like. As another example, user U1 and/or user compute device 120 cannot (e.g., permanently, until user U1 has completed remediation training, etc.) perform certain activities (e.g., send an email, power on, download files, etc.) at certain times and/or days (e.g., outside of working hours, on the weekends, on holidays, etc.).

In some implementations, the remedial action to occur can depend on the severity of the phishing by user U1 (and/or a group of users, as will be discussed below). For example, as the number of times user U1 and/or a group of users (e.g., the human resources department, the junior engineers, those located at a particular office, etc.) has failed a phishing test increase, the severity of the remedial action can also increase. As another example, if user U1 (and/or a group of users) has failed a relatively easy phishing test, the severity of remedial action can also increase (and vice versa, where user U1 failing a relatively harder phishing test can cause and/or recommend a relatively less severe remedial action).

Although FIG. 1 shows only two compute devices, in some implementations, any number of compute devices can be used. For example, in some implementations, a third compute device can be used to track user U1's actions at user compute device 120 to determine if user U1 has failed phishing test 106. As another example, in some implementations, security compute device 100 can send phishing test 106 (and/or a phishing test that is different than phishing test 106) to other compute devices in addition to user compute device 120.

Although FIG. 1 shows model 126 at user compute device 120, in some implementations, model 126 can be at a different compute device, such as security compute device 100; in such a case, security compute device 100 can remotely monitor the actions that user U1 takes at user compute device 120 (e.g., after user compute device 120 has received phishing test 106, after user compute device 120 has preprocessed phishing test 106 for a virus, spam, to unsubscribe, etc.).

Although the above discussion with reference to FIG. 1 mentioned links, in some implementations, phishing test 106 could include something other than a link, such as an attachment simulating a malicious attachment. For example, phishing test 106 could be an email to an employee with a simulated malicious attachment that the employer would not want their employee to click (e.g., access, open, download, etc.). The attachment could be, for example, text-based and/or image-based.

In some implementations, security compute device 100 and/or a compute device not shown in FIG. 1 can track phishing tests that have occurred. In some implementations, security compute device 100 can keep track of how user U1 and/or a group of users has performed for various different types of phishing tests over a period of time. Regarding the tracking of a single user U1, user U1's trends can be determined, such as determining if user U1 is more or less likely to fail a phishing test if the phishing test includes user U1's name or more or less likely to fail a phishing test if the phishing test is sent at a particular time of day. These trends may be considered so that cybersecurity risks associated with user U1 can be mitigated based on the trends, such as modifying an email filter at user compute device 120 to better filter actual phishing emails, causing user U1 to take a remediation training specifically targeting user U1's weak areas, and/or the like. Regarding the tracking of a group of users' (e.g., all electrical engineers, junior attorneys, non-native English speakers, everyone older than 50, all employees of a company, etc.), trends amongst the group of users can be determined, such as determining if the group of users is more or less likely to fail a phishing test if the phishing test includes or omits particular phrases or more or less likely to fail a phishing test if the phishing test is sent at a particular time of day. These trends can be considered so that cybersecurity risks associated with the group of users can be mitigated (or reduced) based on the trends, such as modifying an email filter for those users' compute devices to better filter actual phishing emails, causing those users to take a remediation training specifically targeting their weak areas, and/or the like. Doing so can cause compute devices (e.g., user compute device 120) to have improved cybersecurity.

Network 140 can be any suitable communications network for transferring data, operating over public and/or private networks. For example, network 140 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 140 can be a wireless network such as, for example, a Wi-Fi or wireless local area network ("WLAN"), a wireless wide area network ("WWAN"), and/or a cellular network. In other instances, network 140 can be a wired network such as, for example, an Ethernet network, a digital subscription line ("DSL") network, a broadband network, and/or a fiber-optic network. In some instances, network 140 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via network 140 can be encrypted or unencrypted. In some instances, network 140 can include multiple networks or subnetworks operatively coupled to one another by, for example, network bridges, routers, switches, gateways and/or the like.

Processors (e.g., processor 102 and 122) can be, for example, a hardware-based integrated circuit (IC) or any other suitable processing device configured to run and/or execute a set of instructions or code. For example, the processors can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processors can be configured to run any of the methods and/or portions of methods discussed herein.

Memories (e.g., memory 104 and 124) can be, for example, a random-access memory (RAM), a memory buffer, a hard drive, a read-only memory (ROM), an erasable programmable read-only memory (EPROM), and/or the like. The memories can be configured to store any data used by the processors to perform the techniques (methods, processes, etc.) discussed herein. In some instances, the memories can store, for example, one or more software programs and/or code that can include instructions to cause the processors to perform one or more processes, functions, and/or the like. In some implementations, the memories can include extendible storage units that can be added and used incrementally. In some implementations, the memories can be a portable memory (for example, a flash drive, a portable hard disk, and/or the like) that can be operatively coupled to the processors. In some instances, the memories can be remotely operatively coupled with a compute device (not shown in FIG. 1).

FIG. 2 shows a workflow diagram of a method 200 for a user compute device (e.g., user compute device 120) to determine that a user has failed a phishing test, according to an embodiment. In some implementations, method 200 is performed by a processor (e.g., processor 122).

At 202, a message that is a simulated phishing test (e.g., phishing test 106) is received at a compute device (e.g., user compute device 120) associated with a user (e.g., user U1). The message can be, for example, an email, text, and/or the like. The message can be received from a compute device configured to conduct a simulated phishing test, such as security compute device 100.

At 204, a link included in the simulated phishing test is caused to be selected while not indicating that the user has failed the simulated phishing test. For example, the link can be selected by the compute device and without human interaction to scan the message for a virus, to determine if the message is spam, to unsubscribe from future messages that are similar to the message, and/or the like. In some implementations, step 204 occurs automatically (e.g., without human intervention) in response to completing 202.

At 206, a determination is made (e.g., using model 126), after the link has been clicked (e.g., selected, pressed, attempted to access the clicked item, read, analyzed, inspected, parsed, detected, scanned, etc.), that an action indicating that the user has failed the simulated phishing test has been performed. In some implementations, step 206 does not occurs automatically (e.g., without human intervention) in response to completing 204; rather, 206 occurs after some sort of human intervention that occurred between 204 and 206. For example, some implementations of method 200 further include scanning the message for a virus, the scanning of the message for the virus causing the link to be selected.

Some implementations of method 200 further include causing, automatically (e.g., without human intervention) in response to determining that the action has been performed at 206, a remedial action to be performed. In some implementations of method 200 the remedial action is to cause the user to take cybersecurity remediation training.

In some implementations of method 200, the action is a cursor of the compute device being moved by the user. In some implementations of method 200, the action is a first window running on the compute device being at least one of closed via the user, minimized via the user, or being placed via the user behind a second window running on the compute device. In some implementations of method 200, the action is a predetermined area on a window running on the compute device being clicked.

Some implementations of method 200 further include verifying, prior to determining that the action has been performed, that the compute device is not a mobile device. For example, determining that the compute device is not a mobile device can include determining that the compute device is not running a mobile browser.

In some implementations of method 200, the message is an email. In some implementations of method 200, the message is a short message service (SMS).

FIG. 3 shows a workflow diagram of a method 300 to determine that a user has failed a phishing test, according to an embodiment. In some implementations, method 300 is performed by a processor (e.g., processor 102 and/or 122).

At 302, a determination is made that an email that is a simulated phishing test (e.g., phishing test 106) and associated with a compute device (e.g., user compute device 120) of a user (e.g., user U1) has been clicked (e.g., selected, pressed, attempted to access the clicked item, read, analyzed, inspected, parsed, detected, scanned, etc.) a minimum number of times (e.g., a single time, multiple times, etc.) and that the user has not failed the simulated phishing test. For example, the link may be selected by a compute device (e.g., user compute device 120) the minimum number of times (without human interaction) to scan the email for a virus, to determine if the email is spam, to unsubscribe from future emails that are similar to the email, and/or the like. Step 302 can be performed by a user compute device (e.g., user compute device 120), security compute device (e.g., security compute device 100), and/or the like.

At 304, a determination is made that an action indicating that the user has failed the simulated phishing test has been performed. In some implementations, step 204 does not occur automatically in response to completing 202. Rather, human intervention occurs between 302 and 304. Step 302 can be performed by a user compute device (e.g., user compute device 120), security compute device (e.g., security compute device 100), and/or the like.

Some implementations of method 300 further include causing, automatically (e.g., without human intervention) in response to determining that the action has been performed at 304, the user to take cybersecurity remediation training. For example, an electronic signal can be sent to a compute device, such as a compute device of the user or a compute device configured to assign cybersecurity remediation training, indicating that the user is to take the cybersecurity remediation training. In some implementations, the user's compute device can have less privileges until the user has completed the cybersecurity remediation training (e.g., user can't receive emails from those outside the user's organization).

In some implementations of method 300, the action is a cursor of the compute device being moved by the user. In some implementations of method 300, the action is a window running on the compute device being manipulated by the user. In some implementations of method 300, the action is a predetermined area on a window running on the compute device being clicked.

Some implementations of method 300 further include verifying, prior to determining that the action has been performed at 304, that a mobile browser is not operating on the compute device. Some implementations of method 300 further include verifying, after to determining that the action has been performed at 304, that a mobile browser is not operating on the compute device. Some implementations of method 300 further include verifying, while determining that the action has been performed at 304, that a mobile browser is not operating on the compute device.

In some implementations the email is a first email and the user is a first user. Method 300 further includes determining that a second email that is the simulated phishing test has been clicked the minimum number of times and that the second user has not failed the simulated phishing test. Method 300 further includes determining, after determining that the second email has been clicked the minimum number of times, that the action indicating that the second user has failed the simulated phishing test has been not performed. Method 300 further includes refraining, in response to determining that the action has not been performed, from causing the second user to take cybersecurity remediation training.

Figure 4:
FIG. 4 shows a workflow diagram of a method to determine that a user has not failed a phishing test, according to an embodiment.

FIG. 4 shows a workflow diagram of a method 400 to determine that a user has not failed a phishing test, according to an embodiment. In some implementations, method 400 is performed by a processor (e.g., processor 102 and/or 122).

At 402, a determination is made that an email that includes a simulated phishing test (e.g., phishing test 106) and was sent to a remote compute device (e.g., user compute device 120) associated with a user (e.g., user U1) has been clicked (e.g., selected, pressed, attempted to access the clicked item, read, analyzed, inspected, parsed, detected, scanned, etc.) a minimum number of times. The email being clicked the minimum number of times does not indicate that the user has failed the simulated phishing test. For example, the email may be clicked by a compute device (e.g., user compute device 120) the minimum number of times (without human interaction) to scan the email for a virus, to determine if the email is spam, to unsubscribe from future emails that are similar to the email, and/or the like. Step 402 can be performed by a user compute device (e.g., user compute device 120), security compute device (e.g., security compute device 100), and/or the like.

At 404, a determination is made, after determining that the email has been clicked the minimum number of times, that the user has not failed the simulated phishing test. In some implementations, the determination is made because the user did not move a cursor, the user did not close a window, the user did not minimize a window, the user did not move a window, the user did not select a predetermined icon, the user did select a predetermined icon, the user's device was determined to be a mobile device, and/or the like.

Some implementations of method 400 further include refraining, in response to determining that the user has not failed the simulated phishing test at 404, from causing the user to take cybersecurity remediation training.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

What is claimed is:

1. A non-transitory medium storing code representing instructions to be executed by one or more processors, the instructions comprising code to cause the one or more processors to:
   receive, at a compute device associated with a user, a message that is a simulated phishing test, wherein the simulated phishing test includes a link that, when selected by the user, indicates that the user failed the simulated phishing test;
   detect, at the compute device, without human intervention and automatically in response to receiving the message, the link included in the simulated phishing test was selected at the compute device associated with the user;
   determine, at the compute device, that the automated link selection is a false positive based on the automatic performance of the link selection;
   suppress, at the compute device, the false positive associated with the automated link selection based on the determination;
   detect, at the compute device and after suppressing the false positive associated with the automated link selection, an action performed by the user in association with the link; and
   determine, at the compute device and in response to detecting the user action, that the action indicates the user has failed the simulated phishing test.

2. The non-transitory processor-readable medium of claim 1, wherein the code further comprises code to cause the one or more processors to:
   detect, at the compute device and automatically in response to determining that the action has been performed, a remedial action to be performed.

3. The non-transitory processor-readable medium of claim 2, wherein the remedial action comprises instructing the user to take cybersecurity remediation training.

4. The non-transitory processor-readable medium of claim 1, wherein the action is a cursor of the compute device being moved by the user.

5. The non-transitory processor-readable medium of claim 1, wherein the action is a first window running on the compute device being at least one of closed via the user, minimized via the user, or being placed via the user behind a second window running on the compute device.

6. The non-transitory processor-readable medium of claim 1, wherein the action is a predetermined area on a window running on the compute device being clicked.

7. The non-transitory processor-readable medium of claim 1, wherein the code further comprises code to cause the one or more processors to:
   verify, at the compute device and prior to determining that the action has been performed, that the compute device is not a mobile device.

8. The non-transitory processor-readable medium of claim 1, wherein the message is an email.

9. The non-transitory processor-readable medium of claim 1, wherein the message is a short message service (SMS).

10. The non-transitory processor-readable medium of claim 1, wherein the code further comprises code to cause the one or more processors to:
    scan, at the compute device, the message for a virus, wherein the scanning of the message for the virus causes the link to be selected.

11. A method, comprising:
   receiving, at a compute device associated with a user, a message that is a simulated phishing test, wherein the simulated phishing test includes a link that, when selected by the user, indicates that the user failed the simulated phishing test;
   detecting, at the compute device, without human intervention and automatically in response to receiving the message, the link included in the simulated phishing test was selected at the compute device associated with the user;
   determining, at the compute device, that the automated link selection is a false positive based on the automatic performance of the link selection;
   suppressing, at the compute device, the false positive associated with the automated link selection based on the determination;
   detecting, at the compute device and after suppressing the false positive associated with the automated link selection, an action performed by the user in association with the link; and
   determining, at the compute device and in response to detecting the user action, that the action indicates the user has failed the simulated phishing test.

12. The method of claim 11, further comprising:
   determining, at the compute device and automatically in response to determining that the user has failed the simulated phishing test, instructions to cause the user to take cybersecurity remediation training.

13. The method of claim 11, wherein the action is a cursor of the compute device being moved by the user.

14. The method of claim 11, wherein the action is a window running on the compute device being manipulated by the user.

15. The method of claim 11, wherein the action is a predetermined area on a window running on the compute device being clicked.

16. The method of claim 11, further comprising:
   verifying, at the compute device and prior to determining that the action has been performed, that a mobile browser is not operating on the compute device.

17. The method of claim 11, wherein the method further comprises detecting, at the compute device and automatically in response to determining that the action has been performed, a remedial action to be performed, wherein the remedial action comprises instructing the user to take cybersecurity training.

18. A system comprising:
   a security compute device configured to generate and transmit instructions to a user compute device associated with a user that, when executed, cause the user compute device to perform operations comprising:
      receiving, at the user compute device, a message that is a simulated phishing test, wherein the simulated phishing test includes a link that, when selected by the user, indicates that the user failed the simulated phishing test;
      detecting, at the user compute device, without human intervention and automatically in response to receiving the message, the link included in the simulated phishing test was selected at the user compute device;
      determining, at the user compute device, that the automated link selection is a false positive based on the automatic performance of the link selection;
      suppressing, at the user compute device, the false positive associated with the automated link selection based on the determination;
      detecting, at the user compute device and after suppressing the false positive associated with the automated link selection, an action performed by the user in association with the link; and
      transmitting, from the user compute device to the security compute device, data indicating the action performed by the user in association with the link,
   wherein the security compute device is further configured to determine, based on the transmitted data indicating the action performed by the user, that the action indicates the user has failed the simulated phishing test.

19. The system of claim 18, wherein, when executed, the instructions cause the user compute device to further perform operations comprising: detecting, at the user compute device and automatically in response to determining that the action has been performed, a remedial action to be performed.

20. The system of claim 19, wherein the remedial action comprises instructing the user to take cybersecurity training.

* * * * *